(12) United States Patent
Kuehnle

(10) Patent No.: US 12,300,046 B2
(45) Date of Patent: May 13, 2025

(54) POST-WORK-SHIFT DRIVER TO VEHICLE EVENT ASSOCIATION FOR CONTROLLING VEHICLE FUNCTIONS BASED ON MONITORED DRIVER PERFORMANCE

(71) Applicant: RM ACQUISITION, LLC, Boise, ID (US)

(72) Inventor: Andreas U. Kuehnle, Villa Park, CA (US)

(73) Assignee: RM ACQUISITION, LLC, Chicago, IL (US)

( * ) Notice: Subject to any disclaimer, the term of this patent is extended or adjusted under 35 U.S.C. 154(b) by 249 days.

(21) Appl. No.: 17/869,838

(22) Filed: Jul. 21, 2022

(65) Prior Publication Data

US 2024/0029483 A1 Jan. 25, 2024

(51) Int. Cl.
| | | |
|---|---|---|
| *G07C 5/08* | (2006.01) | |
| *B60W 40/09* | (2012.01) | |
| *G07C 5/00* | (2006.01) | |
| *B60W 40/08* | (2012.01) | |

(52) U.S. Cl.
CPC ........... *G07C 5/0808* (2013.01); *B60W 40/09* (2013.01); *G07C 5/008* (2013.01); *B60W 2040/0809* (2013.01); *B60W 2556/10* (2020.02)

(58) Field of Classification Search
CPC .... B60W 50/14; B60W 60/001; B60W 40/08; B60W 2040/0818; B60W 2050/0001
USPC ........................................................ 701/36
See application file for complete search history.

(56) References Cited

U.S. PATENT DOCUMENTS

| | | | |
|---|---|---|---|
| 8,396,662 B1 * | 3/2013 | Siira ................... | G07C 5/0841 701/521 |
| 10,013,697 B1 * | 7/2018 | Cote ................... | G07C 5/0808 |
| 11,587,091 B1 * | 2/2023 | Lesesky ............. | G06Q 20/3226 |
| 2007/0038338 A1 * | 2/2007 | Larschan .............. | G08G 1/205 701/2 |
| 2022/0005086 A1 * | 1/2022 | Ittiachen ............ | G06Q 30/0207 |
| 2023/0099555 A1 * | 3/2023 | Zhang ................ | B62D 15/0265 701/41 |

* cited by examiner

*Primary Examiner* — Mahmoud S Ismail
(74) *Attorney, Agent, or Firm* — MARSHALL, GERSTEIN & BORUN LLP

(57) ABSTRACT

Each of a plurality of on-vehicle event detection systems generate vehicle event datasets characterizing detected vehicle events, while each of one or more off-vehicle driver log-in/log-out devices generate at least one of: a driver log-in event dataset characterizing a detected driver log-in event, and a driver log-out event dataset characterizing a detected driver log-out event, wherein each driver log-in and driver log-out event is for a respective driver. A database stores the event datasets for retrieval by a linking module. The linking module analyzes two or more of the event datasets, and associates one or more vehicle events with one or more of the respective drivers based on the retrieved event datasets. A vehicle control module generates and transmits a control signal for controlling a vehicle system based on the association.

20 Claims, 5 Drawing Sheets

POST-WORK-SHIFT DRIVER TO VEHICLE EVENT ASSOCIATION FOR CONTROLLING VEHICLE FUNCTIONS BASED ON MONITORED DRIVER PERFORMANCE

FIELD OF THE INVENTION

The invention relates to improvements in systems and methods for controlling vehicle functions based on monitored driver performance, and in particular based on the post-work-shift association of detected vehicle events with potential drivers.

BACKGROUND

Fleets of commercial vehicles currently utilize on-vehicle event monitoring systems to detect events associated with the vehicles and/or their drivers. These monitoring systems often include sensors on the vehicle from which relevant events can be detected.

The current approaches for associating detected events with individual drivers typically involves requiring drivers to log-in to an on-vehicle electronic log-in device (ELD) prior to operating the vehicle for a working period. The on-vehicle monitoring system then associates a vehicle identification with a driver identification of the currently logged-in driver, so that any events detected while the driver is logged-in are attributed to the driver identification of the currently logged-in driver.

The classic example is that driver Joe logs into the on-vehicle ELD at the start of his shift. This ELD data is then stored on-vehicle and used to tag any events detected by the on-vehicle monitoring system while Joe is logged in. At the end of his shift, Joe logs out of the on-vehicle ELD, and any further detected events are not attributed to him.

This approach can be problematic, however, when the vehicle is not equipped with the electronic log-in device, or when the driver identification is otherwise not immediately available. For example, driver Joe may enter work-shift start and/or stop information both independent of any on-vehicle ELD and at some time after the work-shift is competed. In such situations, it can be difficult to accurately associate a detected event with the driver operating the vehicle during the detected event—or even determine who that driver is—because the driver identification information is not immediately available to the on-vehicle monitoring system, but may only be ex post facto available.

As such, there is a need in the art for systems and methods that overcome the aforementioned drawbacks.

SUMMARY OF THE INVENTION

Systems and methods are therefore proposed for post-work-shift driver to vehicle event data association for controlling vehicle functions based on monitored driver performance. The embodiments disclosed herein are based on the observation that it is not always possible to associate detected vehicle events with the driver driving the vehicle at the time of the vehicle event—but that it is possible to ex post facto associate events with drivers who potentially may have been driving the vehicle at the time of the event.

Accordingly, aspects of certain embodiments include a plurality of on-vehicle event detection systems, each of which may generate vehicle event datasets characterizing detected vehicle events. One or more off-vehicle driver log-in/log-out devices, may also be provided, each of which may generate at least one of: a driver log-in event dataset characterizing a detected driver log-in event, and a driver log-out event dataset characterizing a detected driver log-out event, wherein each driver log-in and driver log-out event is for a respective driver. A database may store the event datasets, which may be retrieved by a linking module. The linking module may analyze two or more of the event datasets, and associate one or more vehicle events with one or more of the respective drivers based on the retrieved event datasets. A vehicle control module may generate and transmit a control signal for controlling a vehicle system based on the association.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 1:
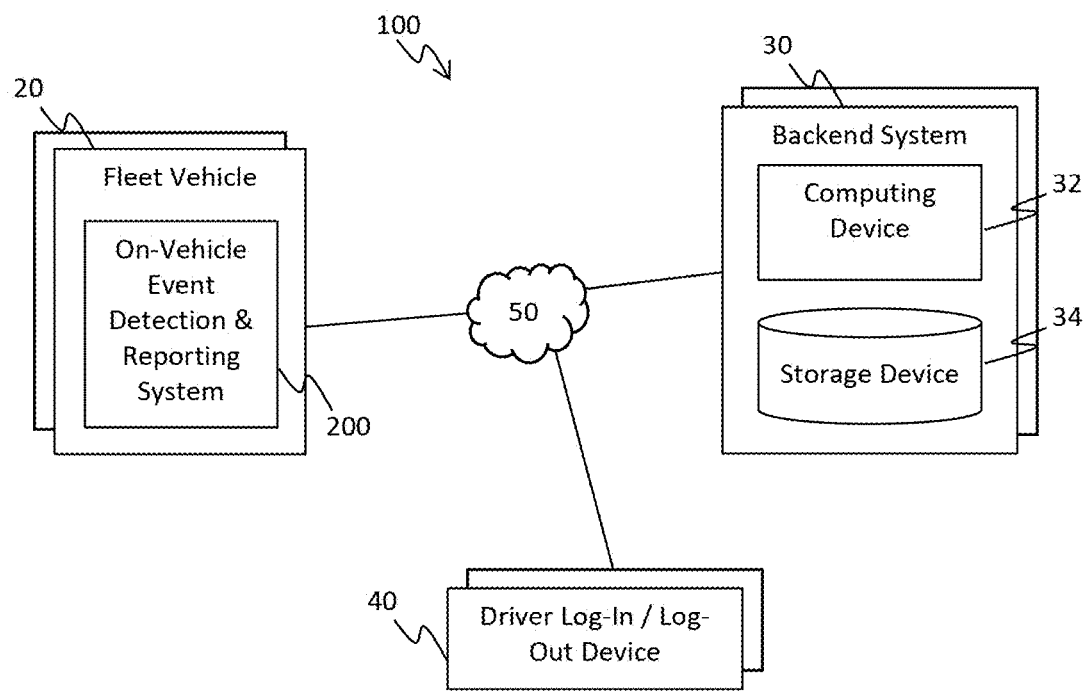
FIG. 1 is a schematic illustration of an exemplary system according to one or more embodiments.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

Further in accordance with the practices of persons skilled in the art, aspects of one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the term "logic," as used herein, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The invention relates generally to systems and methods for driver performance monitoring and vehicle control based thereon.

In certain embodiments, aspects of the invention may be implemented via a fleet management system 100. Referring to FIG. 1, by way of overview, a schematic block diagram is provided illustrating details of the fleet management system 100 adapted for driver performance monitoring and vehicle control based thereon.

In general, the fleet management system 100 includes a plurality of fleet vehicles 20 equipped with an on-vehicle event detection and reporting system 200. The fleet management system 100 also includes a backend system 30, communicatively coupled to each of the vehicles and to one or more driver log-in/log-out devices 40, via a network 50.

The on-vehicle event detection and reporting system 200 may be configured to collect and provide event data corresponding to detected driver and/or vehicle related events occurring during a driving excursion, or even outside of the driving excursion. The event data can include vehicle and/or driver related data collected from components of, or components interacting with, the event detection and reporting system 200, including but not limited to vehicle devices, sensors and/or systems. Accordingly, the event detection and reporting system 200 can detect, in real time, the driver and/or vehicle related events from the collected event data. The event data therefore can include data from which events can be detected will be appreciated, but can also include data that corresponds to the detected event but is not used to detect the event. The detected events and/or the event data can be recorded, stored, collected by, or otherwise communicated internally and/or externally by the event detection and reporting system 200.

Examples of events that may be detected by the event detection and reporting system 200 include but are not limited to: safety events, for example and without limitation, excessive acceleration, excessive braking, exceeding speed limit, excessive curve speed, excessive lane departure, lane change without turn signal, loss of video tracking, LDW system warning, following distance (i.e., headway) alert, forward collision warning, collision mitigation braking, collision occurrence, etc., and non-safety events, for example and without limitation, the driver logging in/out of a vehicle telematics system, the driver/passenger entering/leaving the vehicle, the driver/passenger occupying/vacating the bunk area, the driver occupying/vacating the driver seat, the vehicle engine being on/off, the vehicle gear being in park/drive, the parking brake being set/unset, on/off, etc. Non-safety events may also include theft events, for example and without limitation, the presence of an unauthorized occupant accessing the vehicle, etc.

The event detection and reporting system 200 may use event data collected from vehicle devices, sensors, and/or systems to generate event datasets that correspond in time with one or more detected events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived). For example, video frames from a side-looking camera may be relevant to detecting a cut-in event, in response to which excessive braking of the vehicle may also be detected. Video frames from a driver-facing camera may then be relevant to, for example, determine whether the driver was aware of the passing vehicle prior to its cutting in, and therefore whether the driver could have performed better or differently. Exemplary event detection and reporting systems include the system known as SafetyDirect® provided by Bendix Commercial Vehicle Systems.

The backend system 30 may comprise one or more backend computing devices 32, each including components typically associated with computers, such as one or more processors, physical memories, software instructions, data, displays, and interfaces.

The processor may instruct the components thereof to perform various tasks based on the processing of information and/or data that may have been previously stored or have been received, such as instructions and/or data stored in the memory and/or the storage devices. The processors may be standard processors, such as a central processing unit (CPU), or may be dedicated processors, such as an application-specific integrated circuit (ASIC) or a field programmable gate array (FPGA).

The memory may store at least instructions and/or data that can be accessed by the processor. For example, the memory may be hardware capable of storing information accessible by the processor, such as a ROM, RAM, hard-drive, CD-ROM, DVD, write-capable, read-only, etc. The set of instructions may be included in software that can be implemented on the server computer. It should be noted that the terms "instructions," "steps," "algorithm," and "programs" may be used interchangeably. Data can be retrieved, manipulated or stored by the processor in accordance with the set of instructions or other sets of executable instructions. The data may be stored as a collection of data.

The backend computing device accordingly may include one or more software applications, stored in the memory, which software applications, when executed by the processor configures the backend computing device to function in accordance with one or more embodiments described herein.

The backend system 30 may also include one or more storage devices 34 configured to store large quantities of data and/or information, which may be maintained as one or more databases. For example, the storage device may be a collection of storage components, or a mixed collection of storage components, such as ROM, RAM, hard-drives, solid-state drives, removable drives, network storage, virtual memory, cache, registers, etc. The storage device may also be configured so that the backend computing device may access it in furtherance of executing the functions of the backend system 30. In some embodiments, the storage of the data may be in accordance with one or more database management systems implemented by the backend system 30.

The backend system 30 may generally be configured to process the event data and/or event datasets, and to provide vehicle control based thereon. The vehicle control may be implemented via the communication of one or more control signals to one or more vehicle control systems. Examples of such vehicle control include but are not limited to: providing one or more types of warnings (e.g., driver assistance system warnings, warnings to passengers in the cabin that the driver requires assistance, etc.), intervening in the operation of the vehicle (e.g., to initiate corrective action, to activate harm mitigating features, to assume autonomous control, etc.), alerting remote locations/devices (e.g., backend servers, dispatch center computers, mobile devices, etc.) of detected events, and activation of vehicle automation routines. In some embodiments, the control signal may instruct the vehicle control systems to adjust one or more thresholds for providing warnings, intervening in the vehicle operation, and/or alerting remote locations/devices of detected events. A variety of control actions may be possible and multiple control actions may be initiated at the same time.

In at least some embodiments, the invention relates to the control of vehicle systems based on the driver associated with the detected event. For example, the system may automatically provide driver specific warnings, assistance, adaptations, and/or other types of control, based on the driving history of the driver, particularly the history of associated detected events.

Accordingly, it is of particular interest to determine which drivers are to be associated with which detected events. The backend system 30 may therefore be configured to make this determination for each vehicle event, where possible, based on the detected event data and recorded driver log-in/log-out data.

The driver log-in/log-out data may be provided by the driver log-in/log-out devices 40, which may generally comprise one or more driver computing devices, such as, for example, mobile (e.g., laptop computer, tablet computer, smartphone, PDA, wearable, etc.) or stationary (e.g., desktop computer, etc.), multi-purpose or dedicated, devices configured to communicate data and information with the backend system 30 via the network. The driver computing devices may include components typically associated with such devices, such as one or more processors, physical memories, software instructions, data, displays, and interfaces, as is known in the art. The driver log-in/log-out devices 40 may further comprise one or more cameras or other work time logging or other identifying devices installed at the workplace, which may limit the pool of drivers to associate with the vehicle.

The driver computing devices may be configured, via hardware and/or software configuration, to record driver log-in and log-out data that identifies the driver logging in or out, as the case may be, and also records the log-in/log-out time and location. The driver log-in events and the driver log-out events may occur after one or more vehicle events associated with a vehicle being driven. The driver computing devices may therefore include, for example, a keycard reader (e.g., electronic strip, QR code, etc.), an interactive user interface (e.g., keypad, touchscreen, etc.) for driver credential entry, a biometric sensor (e.g., facial, voice, fingerprint, etc. recognition), or any other device or system via which the driver may log-in and/or log-out. In at least some embodiments, the driver computing devices may be off-vehicle.

The records of the detected events (and/or the datasets thereof), as well as the driver log-in/log-out data may be retrievably stored in the backend system 30 storage device for processing. Moreover, where particular drivers are determined to be associated with detected events, that association may also be retrievably stored in the backend system 30 storage device.

The network may be, in part or in whole, any type of network (e.g., wired and/or wireless) configured to facilitate the communication and transmission of data, instructions, etc. from one component to another component of the network. For example, the network may include a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network. The network is preferably a wireless network wirelessly coupling the backend system 30 to each of the fleet vehicles 20 and to the driver log-in/log-out devices 40.

Figure 2:
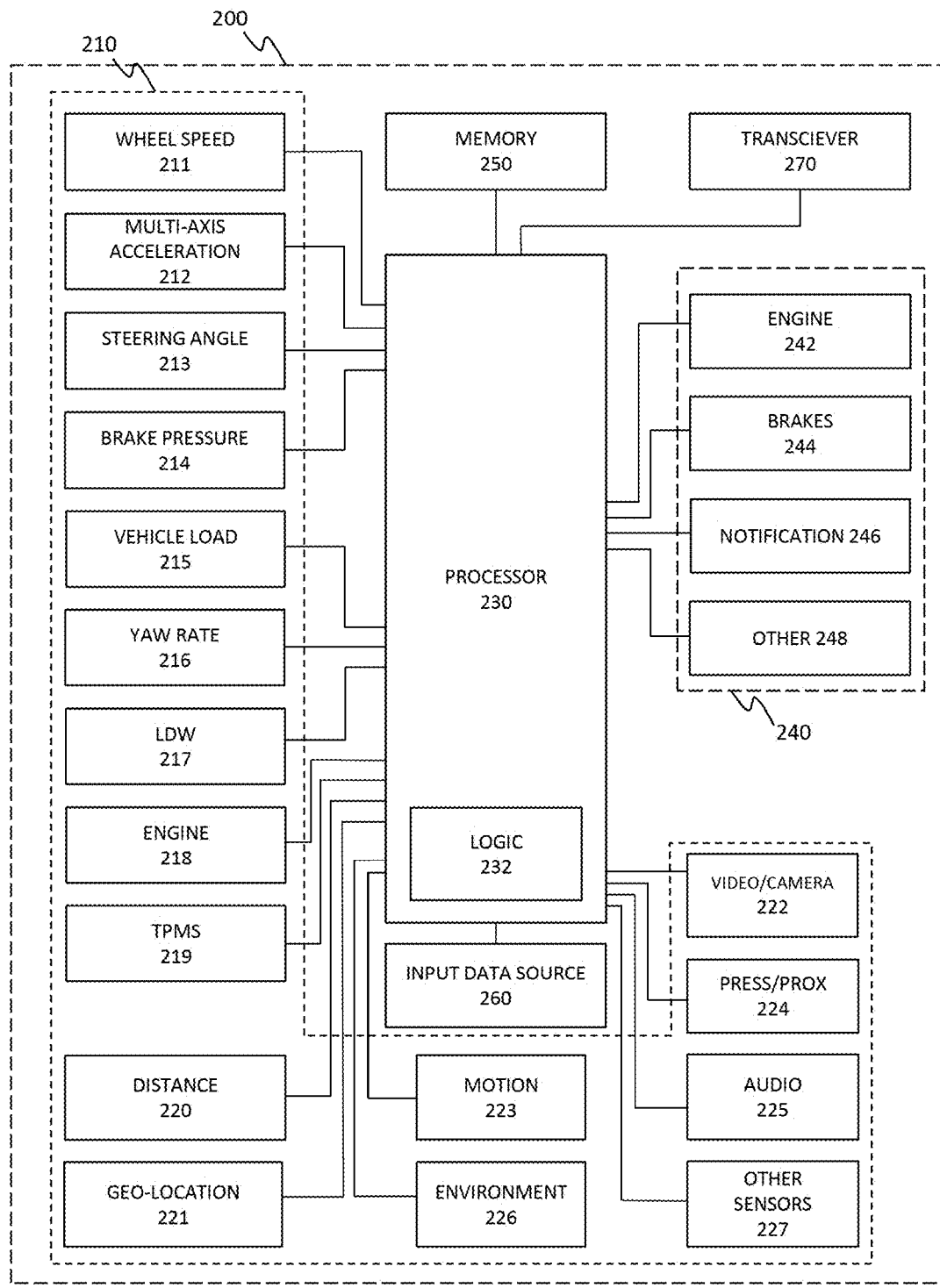
FIG. 2 is a block diagram that illustrates aspects of an event detection and reporting system according to one or more embodiments.

Referring now to FIG. 2, a schematic diagram is shown, illustrating aspects of the on-vehicle event detection and reporting system 200 configured to be used in accordance with one or more embodiments.

The event detection and reporting system 200 may be adapted to detect a variety of operational parameters and conditions of the vehicle and the driver's interaction therewith (i.e., event-based data, etc.) and, based thereon, to determine if a driving and/or vehicle event has occurred (e.g., if one or more operational parameter/condition thresholds has been exceeded). The data related to detected events (i.e., event-based data or data sets) may then be stored and/or transmitted to a remote location/device (e.g., backend server, dispatch center computer, mobile device, etc.), and one or more vehicle systems can be controlled based thereon.

The event detection and reporting system 200 may include one or more devices or systems 210 for providing vehicle and/or driver related data, including data indicative of one or more operating parameters or one or more conditions of a commercial vehicle, its surroundings and/or its cabin occupants. The event detection and reporting system 200 may, alternatively or additionally, include a signal interface for receiving signals from the one or more devices or systems 210, which may be configured separate from system 200. For example, the devices 210 may be one or more sensors, such as but not limited to, one or more wheel speed sensors 211, one or more acceleration sensors such as multi-axis acceleration sensors 212, a steering angle sensor 213, a brake pressure sensor 214, one or more vehicle load sensors 215, a yaw rate sensor 216, a lane departure warning (LDW) sensor or system 217, one or more engine speed or condition sensors 218, and a tire pressure (TPMS) monitoring system 219. The event detection and reporting system 200 may also utilize additional devices or sensors, including for example a forward/lateral/rear distance sensor 220 (e.g., radar, lidar, etc.) and/or a geo-location sensor 221. Additional sensors for capturing driver related data may include one or more video sensors 222 and/or motion sensors 223, pressure or proximity sensors 224 located in one or more seats and/or driver controls (e.g., steering wheel, pedals, etc.), audio sensors 225, or other sensors configured to capture driver related data. The event detection and reporting system 200 may also utilize environmental sensors 226 for detecting circumstances related to the environment of the driving excursion, including for example, weather, road conditions, time of day, traffic conditions, etc. (i.e., environment-based data). Other sensors 227, actuators and/or devices or combinations thereof may be used or otherwise provided as well, and one or more devices or sensors may be combined into a single unit as may be necessary and/or desired. For example, biometric sensors may be included for detecting biometric data of the vehicle occupants.

The event detection and reporting system 200 may also include a logic applying arrangement such as a controller or processor 230 and control logic 232, in communication with the one or more devices or systems. The processor 230 may include one or more inputs for receiving data from the devices or systems. The processor 230 may be adapted to process the data and compare the raw or processed data to one or more stored threshold values or desired averages or value ranges (e.g., representing driving behaviors), or to process the data and compare the raw or processed data to one or more circumstance-dependent desired values (and/or historical evolutions of such values), so as to detect one or more driver and/or vehicle related events.

The processor 230 may also include one or more outputs for delivering a control signal to one or more vehicle control systems 240 based on the detection of the event(s) and/or in response to vehicle and/or driver related data (e.g., if one or more control thresholds has been exceeded). The control signal may instruct the systems 240 to provide one or more types of driver assistance warnings (e.g., warnings relating to braking, obstacle avoidance, etc.) and/or to intervene in the operation of the vehicle to initiate corrective action. For example, the processor 230 may generate and send the control signal to an engine electronic control unit 242 or an actuating device to reduce the engine throttle and slow the vehicle down. Further, the processor 230 may send the control signal to one or more vehicle brake systems 244 to selectively engage the brakes (e.g., a differential braking operation). A variety of corrective actions may be possible and multiple corrective actions may be initiated at the same time. Such corrective actions need not be contemporaneous with detected events and/or event data, and may, additionally or alternatively, be responsive to one or more historical records of detected events and/or event data.

The vehicle control components may include brake light(s) and other notification devices 246, which may be configured to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, and any other type of warning or notification in furtherance of the embodiments described herein. Other vehicle control systems 248 may also be controlled in response to detected events and/or event data.

The event detection and reporting system 200 may also include a memory portion 250 for storing and accessing system information, such as for example the system control logic 232. The memory portion 250, however, may be separate from the processor 230. The sensors 210, controls 240 and/or processor 230 may be part of a preexisting system or use components of a preexisting system.

The event detection and reporting system 200 may also include a source of vehicle-related input data 260, which may be indicative of a configuration/condition of the commercial vehicle and/or its environmental circumstances (e.g., road conditions, geographic area conditions, etc.). The processor 230 may sense or estimate the configuration/condition and/or the environmental circumstances of the vehicle based on the input data, and may select a control tuning or control sensitivity setting based on the vehicle configuration/condition and/or environmental circumstances. The processor 230 may compare the operational data received from the sensors 210 to the information provided by the control tuning.

In addition, the event detection and reporting system 200 may be operatively coupled with one or more driver facing imaging devices, shown for simplicity and ease of illustration as a single driver facing camera 222 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 200 such as a forward facing camera 222 to record images of the roadway ahead of the vehicle. Such cameras may, for instance, indicate proximity to objects, the roadway verge, etc.

In some embodiments, driver related data can be collected directly using the driver facing camera 222, such driver related data including head position, eye gaze, hand position, postural attitude and location, or the like, within the vehicle. In addition, driver identity and/or presence can be determined based on facial recognition technology, body/posture template matching, and/or any other technology or methodology for making such determinations by analyzing video data. In operation, the driver facing camera 222 may video data of the captured image area. The video data may be captured on a continuous basis, or in response to a detected event. Such data may comprise a sequence of video frames with separate but associated sensor data that has been collected from one or more on-vehicle sensors or devices, as detailed herein.

The event detection and reporting system 200 may also include a transmitter/receiver (transceiver) module 270 such as, for example, a radio frequency (RF) transmitter including one or more antennas for wireless communication of data and control signals, including control requests, event-based data, vehicle configuration/condition data, or the like, between the vehicle and one or more remote locations/devices, such as, for example, backend servers, dispatch center computers, and mobile devices, having a corresponding receiver and antenna. The transmitter/receiver (transceiver) module 270 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 may be operative to select and combine signals from the sensor systems into event-based data representative of higher level vehicle and/or driver related data. For example, data from the multi-axis acceleration sensors 212 may be combined with the data from the steering angle sensor 213 to determine excessive curve speed event data. A map and lateral acceleration may be used to determine the same event type. Other hybrid data relatable to the vehicle and/or driver and obtainable from combining one or more selected raw data items from the sensors includes, for example and without limitation, excessive braking event data, excessive curve speed event data, lane departure warning event data, excessive lane departure event data, lane change without turn signal event data, lane change without mirror usage data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, following distance event data, fuel consumption event data, ACC usage event data, and late speed adaptation (such as that given by signage or exiting). Still other hybrid data relatable to the vehicle and/or driver and obtainable from combining one or more selected raw data items from the sensors includes, for example and without limitation, driver out of position event data, passenger out of position event data, driver distracted event data, driver drowsy event data, driver hand(s) not on wheel event data, passenger detected event data, wrong driver event data, seatbelt not fastened event data, driver cellphone use event data, distracting passenger event data, mirror non-use event data, unsatisfactory equipment use event, driver smoking event data, passenger smoking event data, insufficient event response event data, insufficient forward attention event data. The aforementioned events are illustrative of the wide range of events that can be monitored for and detected by the event detection and reporting system 200, and should not be understood as limiting in any way.

The event detection and reporting system 200 may further include a bus or other communication mechanism for communicating information, coupled with the processor 230 for processing information. The system may also include a main memory 250, such as random access memory (RAM) or other dynamic storage device for storing instructions and/or loaded portions of a trained neural network to be executed by the processor 230, as well as a read only memory (ROM) or other static storage device for storing other static information and instructions for the processor 230. Other storage devices may also suitably be provided for storing information and instructions as necessary or desired.

In at least some embodiments, the event detection and reporting system 200 of FIG. 2 is configured to execute one or more software systems or modules that perform or otherwise cause the performance of one or more features and aspects described herein. Computer executable instructions may therefore be read into the main memory 250 from another computer-readable medium, such as another storage device, or via the transceiver 270. Execution of the instructions contained in main memory 250 may cause the processor 230 to perform one or more of the process steps described herein. In some embodiments, hard-wired circuitry may be used in place of or in combination with software instructions to implement the invention. Thus, implementations of the example embodiments are not limited to any specific combination of hardware circuitry and software.

Figure 3:
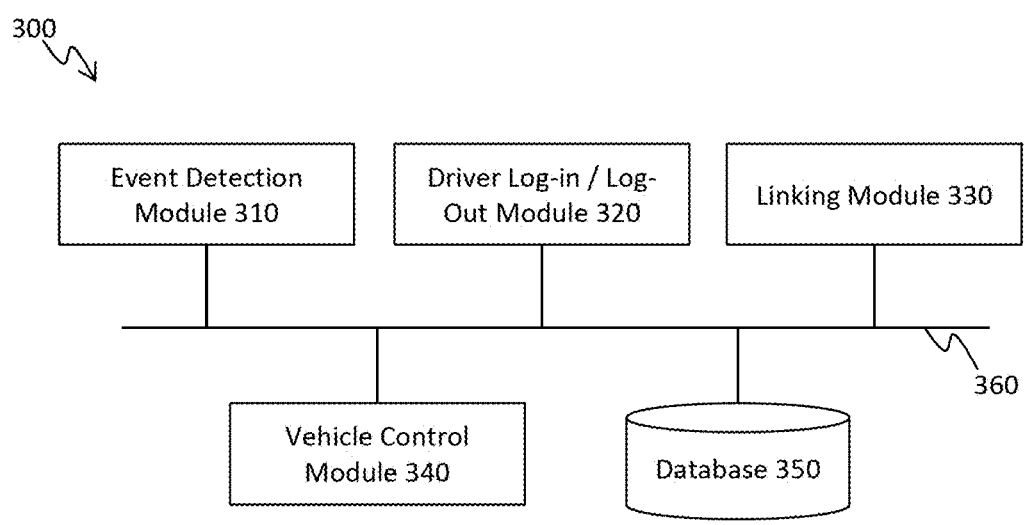
FIG. 3 is a block diagram that illustrates aspects of an exemplary system architecture according to one or more embodiments.

Referring now to FIG. 3, a schematic block diagram is shown, illustrating aspects of a system architecture 300 for associating drivers with detected vehicle events in accordance with one or more embodiments. The system architecture 300 may comprise: an event detection module 310, a driver log-in/log-out module 320, a linking module 330, a vehicle control module 340, and a database 350, operatively coupled via network connection 360.

As will be apparent to those of ordinary skill in the art, the system architecture 300, or portions thereof, may be implemented via one or more components of the fleet management system 100 of FIG. 1. To that end, the system architecture 300 may include one or more functional modules embodied by one or more processors, alone or in combination with other components of the fleet management system 100, executing one or more software applications so as to configure the processors to implement the described functions, or otherwise cause the implementation of such functions via other components.

The vehicle event detection module 310 may be implemented, in whole or in part, via the on-vehicle event detection and reporting system 200, and may be configured to detect one or more vehicle events so as to generate corresponding vehicle event datasets E characterizing the detected vehicle events. The vehicle event datasets E may be generated substantially contemporaneous with the corresponding detected vehicle events. The vehicle event detection module 310 may comprise hardware and/or software that is appropriately configured to implement the functions described herein.

Each of the vehicle event datasets E may include one or more dataset parameters. The dataset parameters may, for example, include: corresponding event data β, event time T (i.e., the time at which the vehicle event occurred), and event location L (i.e., the location where the event occurred). The vehicle event dataset E may also include the dataset parameters for: vehicle identification VIN of the vehicle associated with the vehicle event, and driver identification UID of the driver associated with the vehicle event.

The dataset parameters may have respective values such that vehicle events may be characterized by the respective values for one or more of the dataset parameters. In some embodiments, the vehicle event datasets E may be missing values for one or more of the dataset parameters. In particular, vehicle event datasets E may be missing values for vehicle identification VIN and/or driver identification UID—but preferably includes values for at least event time T and event location L. In at least one embodiment, vehicle event datasets E may be missing values for at least the driver identification UID parameter.

The vehicle event datasets E may be transmitted to the database 350 and retrievably stored therein. In at least one embodiment, the vehicle event datasets E may be retrieved and utilized to determine which drivers are to be associated with which detected vehicle events. In particular, this determination can be made out-of-time with the vehicle event detection.

The driver log-in/log-out module 320 may be implemented, in whole or in part, via the driver log-in/log-out devices 40, and may be configured to record driver log-in and log-out events so as to generate log-in datasets X and log-out datasets X' corresponding to and characterizing the log-in and log-out events, respectively. The driver log-in/log-out module 320 may comprise hardware and/or software that is appropriately configured to implement the functions described herein.

The driver log-in event datasets X may include one or more dataset parameters, which may, for example include: log-in location l (i.e., the location of the log-in event), and log-in time t (i.e., the time of the log-in event). By the same token, the driver log-out event dataset X' may include one or more dataset parameters, including: log-out location l' (i.e., the location of the log-out event), and log-out time t' (i.e., the time of the log-out event). The driver log-in/log-out event datasets X, X' may also include the dataset parameters for: vehicle identification VIN of the vehicle associated with the driver log-in/log-out events, and driver identification UID of the driver associated with the driver log-in/log-out events. The datasets may also contain delivery/pickup locations or routes to be driven.

The dataset parameters may have respective values such that driver log-in/log-out events may be characterized by the respective values for one or more of the dataset parameters. In some embodiments, the driver log-in/log-out event datasets X, X' may be missing values for one or more of the dataset parameters—e.g., due to error, malfunction, design, unavailability, untrustworthiness, or some other reason. In at least one embodiment, driver log-in/log-out event datasets X, X' may be missing or have incorrect values for at least the vehicle identification VIN parameter.

The driver log-in/log-out event datasets may be transmitted to the database 350 and retrievably stored therein. In at least one embodiment, the log-in/log-out event datasets X, X' may be retrieved and utilized to determine which drivers are to be associated with which detected vehicle events. In particular, this determination can be made out-of-time with the vehicle event detection.

The linking module 330 may be implemented, in whole or in part, via the backend system 30, and may be configured to analyze vehicle event, log-in event and log-out event datasets so as to determine which drivers are to be associated with which detected vehicle events, particularly out-of-time with the vehicle event detection. The linking module 330 may comprise hardware and/or software that is appropriately configured to implement the functions described herein.

In some embodiments, determining which drivers are to be associated with which detected vehicle events includes establishing plausible links 442, 443, 444 among and between vehicle event nodes 420, corresponding to detected vehicle events, and driver log-in/log-out nodes 410 and 430, corresponding to driver log-in/log-out events. The linking module 330 may establish plausible links via any process or combination of processes, such as for example, via the exemplary processes described herein.

Figure 4A:
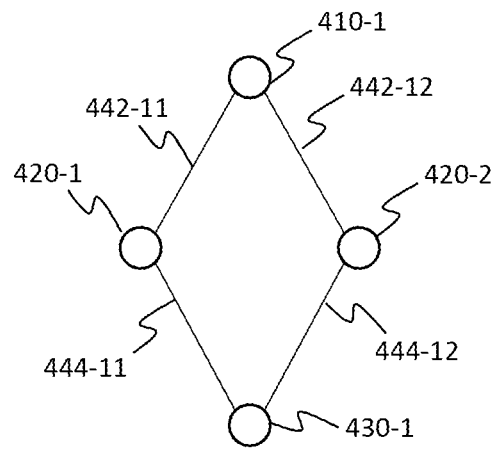
FIGS. 4A-4C are diagrams illustrating aspects of exemplary plausible links between event nodes according to one or more embodiments.
Figure 4B:
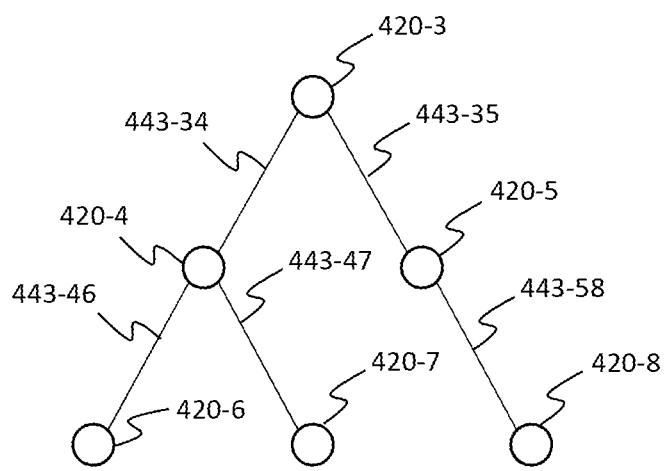
Figure 4C:
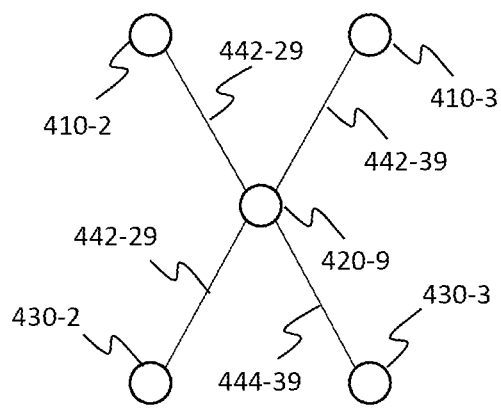

Referring now to FIGS. 4A-4C, a schematic diagram is shown, illustrating aspects of exemplary plausible links 442, 443 and 444 between vehicle event nodes 420, driver log-in nodes 410, and driver log-out nodes 430 in accordance with one or more embodiments.

FIG. 4A shows plausible links 442-11 and 442-12 linking driver log-in node 410-1 to vehicle event nodes 420-1 and 420-2, as well as plausible links 444-11 and 444-12 linking driver log-out node 430-1 to vehicle event nodes 420-1 and 420-2. The plausible link 442-11 indicates that it is plausible (or at least not implausible) that the driver associated with driver log-in node 410-1 was driving the vehicle associated with vehicle event node 420-1 during the corresponding vehicle event. The plausible link 442-12 similarly indicates the plausibility that the driver associated with driver log-in node 410-1 was driving the vehicle associated with vehicle event node 420-2 during the corresponding vehicle event. The plausible link 444-11 similarly indicates the plausibility that the driver associated with driver log-out node 430-1 was driving the vehicle associated with vehicle event node 420-1 during the corresponding vehicle event. The plausible link 444-12 similarly indicates the plausibility that the driver associated with driver log-out node 430-1 was driving the vehicle associated with vehicle event node 420-2 during the corresponding vehicle event.

FIG. 4B shows plausible links 443-34 and 443-35 linking vehicle event node 420-3 to vehicle event nodes 420-4 and 420-5. Additional plausible links 443-46 and 443-47 are also shown linking vehicle event node 420-4 to vehicle event nodes 420-6 and 420-7. A still additional plausible link 443-58 is also shown linking vehicle event nodes 420-5 and 420-8. Each plausible link 443 linking vehicle event nodes 420 indicates the plausibility of the corresponding vehicle events being attributable to the same driver. It will be understood that the plausible links 443 may be established, based on analysis of the corresponding event datasets, even where the identity of the driver is unknown.

FIG. 4B also shows vehicle event nodes 420-5 and 420-7 (or 420-4, etc.) that are not plausibly linked. In this case, the vehicle events are not plausibly attributable to the same driver. The same applies to driver log-in/log-out event nodes 430 that are not plausibly linked to vehicle event nodes 420.

FIG. 4C shows plausible links 442-29 and 442-39 linking vehicle event 420-9 and driver log-in events 410-2 and 410-3, as well as plausible links 444-29 and 444-39 linking vehicle event 420-9 to driver log-out events 430-2 and 430-3. The plausible links 442-29 and 442-39 indicate the plausibility that any of the drivers associated with the driver log-in nodes 410-1 were driving the vehicle associated with vehicle event node 420-2 during the corresponding vehicle event.

Figure 5C:
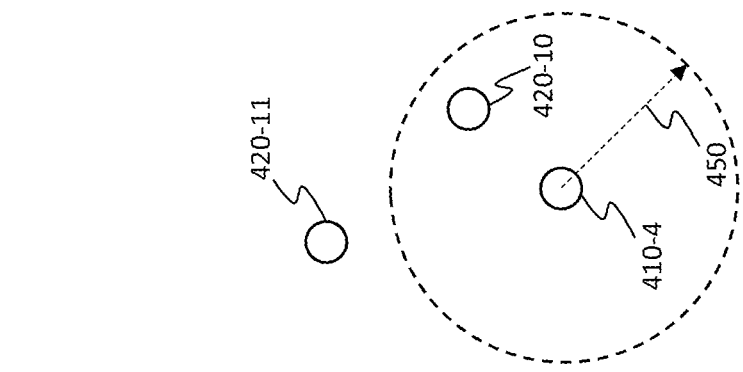
FIG. 5C is a schematic diagram illustrating aspects of exemplary plausibility limits according to one or more embodiments.
Figure 5B:
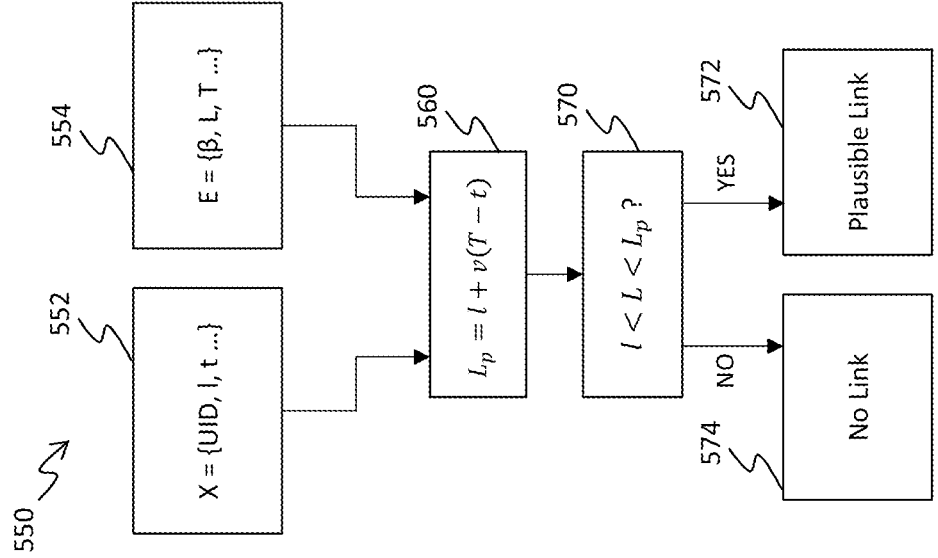
FIGS. 5A-5B are flow-charts illustrating exemplary methods for establishing plausible links between event nodes according to one or more embodiments.
Figure 5A:
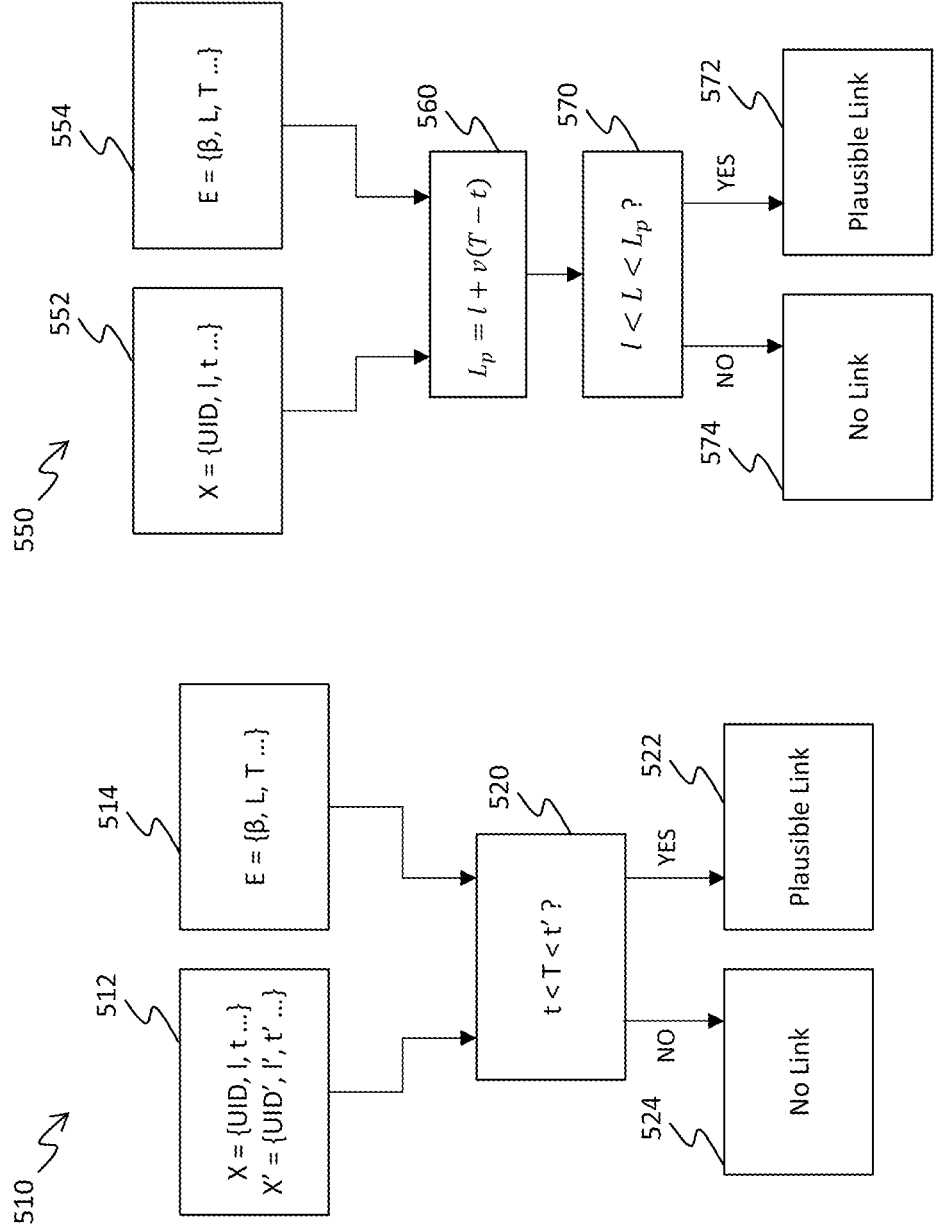

Referring now to FIGS. 5A to 5B, schematic flow-charts are shown, illustrating aspects of exemplary processes for establishing plausible links 442, 444 among and between vehicle event nodes 420 and driver log-in/log-out nodes 410, 430.

FIG. 5A illustrates an exemplary process 510 for plausibly linking vehicle event nodes 420 to driver log-in and log-out event nodes 410, 430 of the same driver. The process may be similarly applied to a plurality of vehicle event nodes 420, as will be apparent.

In step 512, the driver log-in and log-out datasets X, X' of the same driver are provided (e.g., retrieved from the database 350). The driver log-in/log-out event datasets X, X' are ensured to correspond to the same driver via matching driver identification UID values. The driver log-in/log-out event datasets X, X' also include at least the log-in/log-out times, thus defining the working period for the driver.

In step 514, the vehicle event dataset E is provided (e.g., retrieved from the database 350). The vehicle event dataset E does not include the driver identification UID value—and the associated driver is therefore unknown. However, the vehicle event dataset E does include at least the event time T.

In step 520, the log-in/log-out times and the event time T are compared so as to determine whether the event time T is within the working period of the driver. If so, the driver log-in and log-out event nodes 410, 430 may be plausibly linked to the vehicle event nodes 420 (step 522). If not, the driver log-in and log-out event nodes 410, 430 may not be plausibly to the vehicle event 420 (i.e., the link is determined to be implausible) (step 524).

FIG. 5B illustrates an exemplary process 550 for plausibly linking vehicle event nodes 420 to driver log-in event nodes 410. The process may be similarly applied to linking a plurality of vehicle event nodes 420, and to linking vehicle event nodes 420 to driver log-out event nodes 430, as will be apparent.

In steps 552 and 554, the driver log-in dataset X and the vehicle event dataset E are provided (e.g., retrieved from the database 350). The driver log-in event dataset X includes at least the driver identification UID of the target driver, as well as the log-in time and the log-in location 1. The vehicle event dataset E includes at least the event time T and the event location L.

In step 560, the datasets are analyzed to determine a plausible range 450. The plausible range 450 may reflect an outer limit for how far the driver could plausibly drive from the log-in location 1 in the time period from the log-in time to the event time T. In some embodiments, the plausible range 450 may be determined according to the following formula:

$$L_p = l + v(T-t),$$

where $L_p$ is the plausible range, and v is a road network permeability factor reflecting the ability of the vehicle to freely travel within the area road network (i.e., a plausible average vehicle speed). The road network permeability factor may be determined based on legal (e.g., speed limits, etc.), policy (e.g., working hours, etc.), and/or environmental (e.g., traffic, weather, etc.) conditions.

In some embodiments, the network permeability factor may be determined based on the length and nature of the shortest or most likely paths (e.g., roadways) connecting events to each other. For example, the traversal of a narrow, winding, mountain road on which two events occur will be slower than on a straight, broad highway. The permeability factor may further be based on historical, time of day dependent, roadway speed maps. Ordering by event time stamp and location may still further aid in association of events with each other, as discussed herein.

Moreover, the road network permeability factor may vary according to the geographic area, such that the road network permeability factor may be different for different geographic areas. For example, where the area road network allows for greater average speed, the network permeability factor may be higher. Similarly, where the area road network tends to be more restrictive of average speed, the network permeability factor may be lower.

In step 570, the event location L is compared to the plausible range $L_p$, so as to determine whether the event location L is within the plausible range. If so, the plausible link may be established (step 572) between the vehicle event and the driver log-in. If not, the plausible link may not be established (step 574).

FIG. 5C illustrates an exemplary scenario in which the plausible range 450 is shown around the driver log-in event 410-4. As can be seen, vehicle event 420-10 is within the plausible range 450 of driver log-in event 410-4, but vehicle event 420-11 is not. The plausible link may therefore be established between driver log-in event 410-4 and vehicle event 420-10—but not between driver log-in event 410-4 and vehicle event 420-11.

It will be appreciated that these same principles may be applied to determine the plausible range 450 about vehicle events, rather than about log-in/log-out events. In such cases, the plausible link may be established where the log-in/log-out event is within the plausible range 450 of the vehicle event. The principle may be similarly applied to a plurality of log-in/log-out events, so as to establish plausible links between the vehicle event and one or more drivers. Accordingly, via establishing various plausible links, one or more drivers can be associated with one or more vehicle events that occurred within the plausible ranges of each other.

In addition, where the vehicle identification VIN is present in both the vehicle event dataset E and at least one of the driver log-in/log-out event datasets X, X', plausible links may be established via matching vehicle identification VIN values directly. Two or more vehicle events can be similarly linked via directly matching vehicle identification VIN values.

In some embodiments, the linking module 330 further may be configured to establish plausible links between vehicle events where the vehicle identification VIN for at least one of the vehicle events is unknown—and directly matching vehicle identification VIN values is therefore not possible. The plausible links may be established via any effective process or combination of processes. In at least one embodiment, the plausible links may be established via the process described with reference to FIG. 5B, except as between vehicle events. Thus, it is possible to establish the plausibility that two or more vehicle events involved the same unknown driver.

In some embodiments, where multiple processes for establishing plausible links are applied, the plausible link may be established where each process agrees that the plausible link exists. In other words, each of the processes may filter out links that are not plausible links. For example, the process of FIG. 5A may exclude all links outside of the log-in to log-out time period, and the process of FIG. 5B may exclude all links outside of the respective plausible ranges 450, such that the plausible links are established only for the non-excluded links. Accordingly, various plausible links may be established among vehicle events, and between vehicle events and driver log-in/log-out events.

Referring back to FIGS. 4A to 4B, the linking module 330 may further be configured to analyze one or more plausible links so as to determine a set of plausible drivers for each vehicle event, based on the corresponding datasets. In particular, the linking module 330 may consider the driver identification UID values of driver log-in/log-out events that are plausibly linked to each vehicle event, or sequence of events (i.e., event paths), so as to include the corresponding driver identification UID values of the linked log-in/log-out events in the set of plausible drivers for that vehicle event, or sequence of vehicle events (or otherwise exclude drivers). In some embodiments, where no known drivers are identified as plausible drivers, the plausible links of the unknown driver can be saved to the database 350 for future analysis and/or driver identity determination.

For example, in FIG. 4A, the set of plausible drivers for the vehicle event associated with vehicle event node 420-1 may include the driver associated with driver log-in event 410-1. The set of plausible drivers may also include the driver associated with driver log-out event 430-1, if the driver log-out event 430-1 has a different driver identification UID value (i.e., it belongs to a different driver).

Similarly, considering FIG. 4B, the set of plausible drivers for the vehicle event path 450-1 (i.e., the sequence of vehicle events 420-3, 420-5, 420-8) may include a first TBD driver, indicating the that the driver is unknown but is plausibly the same driver for the event path 450-1. Similarly, the sets of plausible drivers for vehicle event paths 450-2 and 450-3 may include a second TBD driver and a third TBD driver, respectively. It will be apparent that at any time where the identity of a TBD driver is determined, the set of plausible drivers may be updated to reflect that identity (e.g., via the driver identification UID value).

The set of plausible drivers for each vehicle event, or event path, may further be ranked according to how plausible the links are. Such ranking may be retrievably stored in the database 350 in association with the vehicle event. The ranking may further be updated to account for updated determinations based on event data collected during additional excursions. For example, driver A may be initially identified as more probably the driver identity of the unknown driver, versus driver B—but later event data can result in driver B being identified as more the more probable driver identity over driver A. The ranking can therefore be a dynamic ranking that can be updated in real-time and/or periodically.

Moreover, the linking module 330 may further be configured to determine a plausibility metric, which quantifies how plausible the respective plausible link is, and by which the set of plausible drivers may be ranked.

The plausibility metric may be determined based on the event data $\beta$, such as for example, video data (e.g., from the driver facing camera, etc.) and/or other sensor data. In some embodiments, event data (e.g., cabin video) recorded during plausibly linked vehicle events may reveal differences in driver appearance, attire, surroundings, etc., that increase or decrease the plausibility that the linked vehicle events involve the same driver. For example, where the driver of one vehicle event is recorded as wearing a green shirt and the driver of the other vehicle event is shortly thereafter recorded as wearing a red shirt, the drivers may not be the same. The plausibility metric for the link may therefore be lower. By contrast, the plausibility metric may be higher where there is greater similarity between cabin video data.

Similarly, vehicle sensor data recorded during plausibly linked vehicle events may reveal differences in vehicle states, behaviors, etc., that increase or decrease the plausibility that the same vehicle is involved. For example, where sensor data from a sensor is present in one vehicle event but is missing in another (e.g., because the sensor may be broken or may not exist (not all vehicles have radar systems, for example)), the vehicles may not be the same. The plausibility metric for the link may therefore be lower. By contrast, the plausibility metric may be higher where there is greater similarity between sensor data.

The plausibility metric further may be determined based on the analysis of the event datasets resulting in the plausibility link. For example, referring to the process of FIG. 5A, the plausibility metric may be lower/higher based on the temporal closeness of the vehicle event to either of the log-in/log-out events. In other words, the dataset analysis may be understood as establishing the limits of plausibility, and events falling closer to those limits are less plausible. For example, while technically still plausible under the analysis of FIG. 5A, it is not highly likely that the same driver was involved in a major collision event within 5 minutes of that driver's log-out event. This principle may be equally applied to the process of FIG. 5B, with the plausible range 450 setting the limit of plausibility from which the plausibility metric may be determined.

In some embodiments, the plausibility metric may be determined for one or more event paths, as an average or otherwise aggregate of the individual plausibility metrics of the plausible links making up the event path. The linking module 330 may further analyze the plausible links to identify the most plausible global state. In other words, identifying, out of all the event paths, the set of event paths that maximizes the plausibility of the system. The linking module 330 may identify the most plausible global state via solving a corresponding optimization problem using, for example, artificial intelligence and/or machine learning techniques. Accordingly, the set of plausible drivers for each event path may be ranked according to the plausibility metric of the event path. Moreover, the ranking of event paths may account for the determined global plausibility.

The linking module 330 may further be configured to associate the determined set of plausible drivers (ranked and/or unranked) with the vehicle related event, and to store such association in the database 350. For example, a detected vehicle event may be associated with a predetermined number of determined plausible drivers. Such association may be further analyzed to identify the unknown driver from among the set of plausible drivers. For instance, a driver's typical event profile mixture (e.g. 25% longitudinal events, 75% lateral events) may be compared with a set of chained events and the resulting mixture.

Referring now to FIG. 3, the system architecture 300 may further comprise the vehicle control module 340, which may be configured to control one or more vehicle systems based on the determined set of plausible drivers (i.e., one or more plausible drivers). In particular, the vehicle control module 340 may deliver a control signal to one or more vehicle control systems based on driver performance metrics determined based the driver-event association. The control signal may instruct the systems to provide one or more types of driver assistance warnings (e.g., warnings relating to braking, obstacle avoidance, etc.) and/or to intervene in the operation of the vehicle to initiate corrective action. A variety of corrective actions may be possible and multiple corrective actions may be initiated at the same time. It will be understood that such corrective actions need not be contemporaneous with detected events and/or event data, and may, additionally or alternatively, be responsive to one or more historical records of detected events and/or event data. For example, the corrective actions may be based on the historical records of the set of plausible drivers.

The vehicle control module 340 may further deliver a control signal to one or more notification devices, so as to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, and any other type of warning or notification in furtherance of the embodiments described herein. Other vehicle control systems may also be similarly controlled based on the determined set of plausible drivers.

Figure 6:
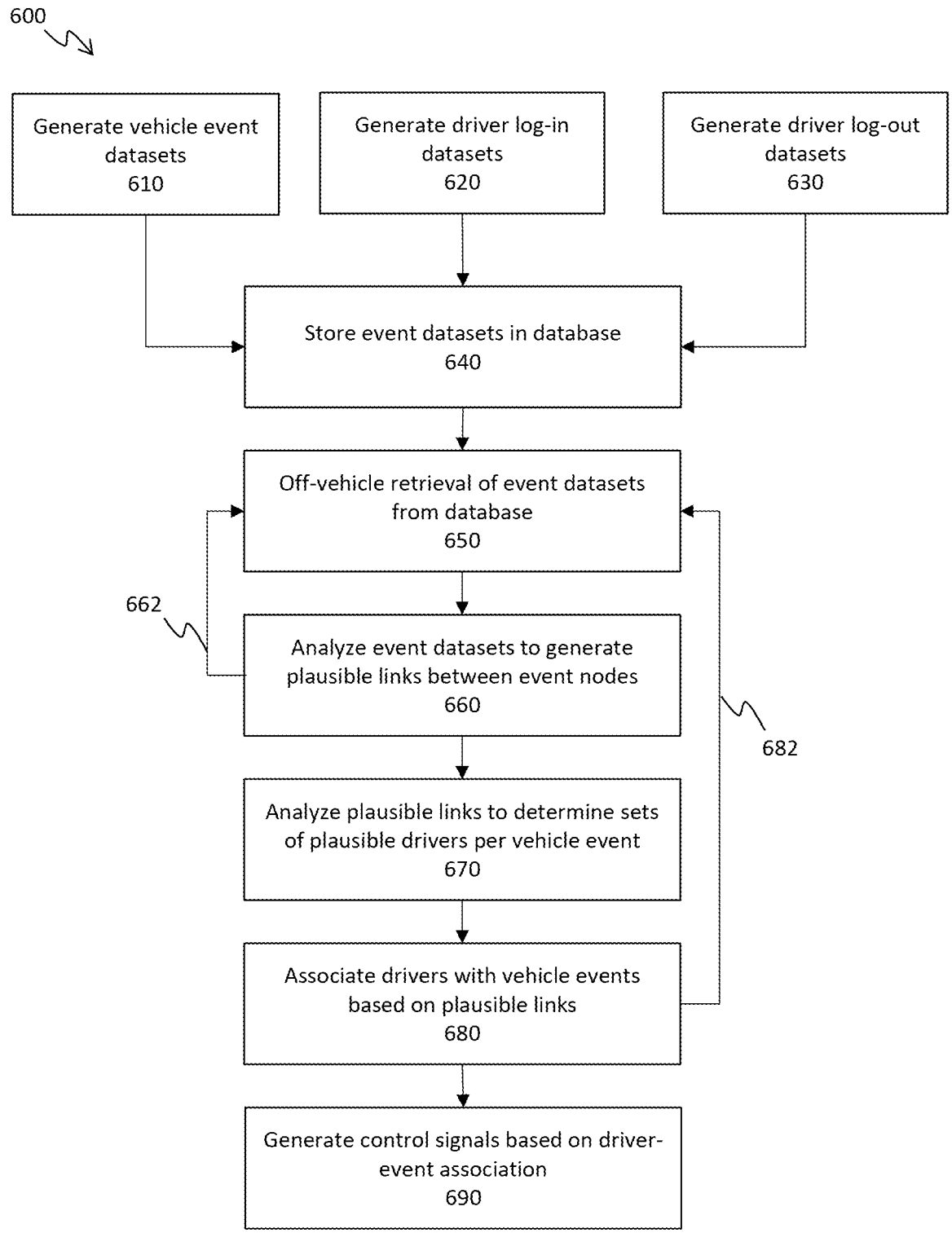
FIG. 6 is a flow-chart illustrating exemplary methods in accordance with aspects of one or more embodiments.

Referring now to FIG. 6, a flow-chart is show that illustrates aspects of an exemplary method 600 for driver performance monitoring and vehicle control based thereon, according to at least one embodiment.

In steps 610, 620 and 630, vehicle events, driver log-in events, and driver log-out events are detected and corresponding datasets are generated. The vehicle event datasets E may be generated via the vehicle event detection module 310, and may be generated substantially contemporaneous with the detection of the corresponding vehicle events, as discussed herein. The driver log-in and log-out datasets X, X' may be generated via the driver log-in/log-out module 320, as discussed herein. The event datasets may be transmitted to the database 350 and retrievably stored therein, in step 640.

In steps 650 and 660, one or more of the event datasets are retrieved from the database 350 and analyzed to establish plausible links between corresponding event nodes. This may be carried out by the linking module 330, as discussed herein. The plausible links may be established between vehicle event nodes, and/or between vehicle event nodes and driver log-in/log-out nodes. The process of steps 650 and 660 may be looped 662 to update (i.e., establish and/or eliminate) plausible links based on additional datasets.

In steps 670, for each vehicle event, the plausible links are analyzed to determine a corresponding set of plausible drivers for the vehicle event. This may be carried out by the linking module 330, as discussed herein. In particular, consideration of the driver identification UID values of driver log-in/log-out events that are plausibly linked to each vehicle event, or sequence of events (i.e., event paths), may be made so as to include the corresponding driver identification UID values of the linked log-in/log-out events in the set of plausible drivers for that vehicle event, or sequence of vehicle events (or otherwise exclude drivers). In some embodiments, where no known drivers are identified as plausible drivers, the plausible links of the unknown driver can be saved to the database 350 for future analysis and/or driver identity determination.

In step 680, for each vehicle event, one or more drivers of the set of plausible drivers is associated with the vehicle event. This association may be via the plausibility metric, as discussed herein. For example, only the most plausible driver, or predetermined number of drivers, may be associated with the vehicle event. The process of steps 650 to 680 may further be looped 682 to update driver-event association.

In step 690, one or more control signals are generated and output to one or more vehicle control systems based on the association of drivers to vehicle events. The control signals may be generated via the vehicle control module 340, as discussed herein. In particular, the vehicle control module 340 may deliver control signals to one or more vehicle control systems based on driver performance metrics determined based the driver-event association. The control signals may instruct the systems to provide one or more types of driver assistance warnings (e.g., warnings relating to braking, obstacle avoidance, etc.) and/or to intervene in the operation of the vehicle to initiate corrective action. Accordingly, driver performance monitoring and vehicle control based thereon can be effectuated.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for driver performance and identity based vehicle control, the system comprising:
   a plurality of on-vehicle event detection systems, each on-vehicle event detection system including one or more sensors which detect vehicle events, and a processor configured to generate vehicle event datasets characterizing the detected vehicle events, each on-vehicle event detection system further including a communication device for transmitting the vehicle event datasets characterizing detected vehicle events via a communication network;
   one or more off-vehicle driver log-in/log-out devices, each configured to generate at least one of: a driver log-in event dataset characterizing a detected driver log-in event, and a driver log-out event dataset characterizing a detected driver log-out event, wherein each driver log-in and driver log-out event is for a respective driver, each of the one or more off-vehicle driver log-in/log-out devices including a further communication device for transmitting the generated at least one of the driver log-in event dataset and the driver log-out event dataset via a communication network; and
   a backend computer system including:
      a receiver coupled to the communication network that receives the vehicle event data sets from the on-vehicle event detection systems and that receives the least one of the driver log-in event dataset and the driver log-out event dataset from the one or more off-vehicle driver log-in/log-out devices, wherein the receiver receives the vehicle event data sets from the on-vehicle event detection systems independently of the least one of the driver log-in event dataset and the driver log-out event dataset from the one or more off-vehicle driver log-in/log-out devices;
      a database, coupled to the receiver and configured to store event datasets, including the generated vehicle event datasets, driver log-in event datasets, and driver log-out event datasets, wherein the database stores the vehicle event datasets independently of the driver log-in event datasets and the driver log-out event datasets;
      a linking module, stored in a computer memory and configured to operate on a computer processor of the backend computer system, the linking module configured to retrieve two or more of the event datasets from the database, and to determine an association between one or more vehicle events and one or more of the respective drivers based on the retrieved event datasets including one of the vehicle event datasets and one or more of the driver log-in and driver log-out datasets, to thereby determine one or more drivers of a particular vehicle at a time that a vehicle event for the particular vehicle occurred; and
      a vehicle control module, stored on a computer readable memory and configured to execute on a processor to generate and transmit a control signal for controlling a vehicle system to a vehicle via the communication network, based on the association of the one or more vehicle event with the one or more respective drivers.

2. The system of claim 1, wherein the linking module associates the one or more vehicle events with the one or more respective drivers after the generation of the vehicle event datasets corresponding to the associated vehicle events.

3. The system of claim 1, wherein the database and the linking module are off-vehicle.

4. The system of claim 1, wherein the vehicle event dataset includes: an event time and an event location.

5. The system of claim 1,
   wherein each driver log-in event datasets includes data characterizing respective log-in time, log-in location, and driver identification, and
   wherein each driver log-out event dataset includes data characterizing respective log-out time, log-out location, and driver identification.

6. The system of claim 1,
   wherein the linking module is further configured to establish one or more plausible links between vehicle events, and between vehicle events and driver log-in/log-out events, and
   wherein the linking module associates the one or more vehicle events with the one or more respective drivers based on the one or more plausible links between vehicle events.

7. The system of claim 6, wherein the plausible links are determined based on a calculated temporal limit.

8. The system of claim 6, wherein the plausible links are determined based on a determined range limit.

9. The system of claim 1, wherein the association of one or more vehicle events with one or more of the respective drivers includes associating at least one vehicle event with a plurality of drivers according to the plausibility of each individual association.

10. The system of claim 1, wherein the driver log-in event and the driver log-out event occur after the one or more vehicle events.

11. A method for driver performance and identity based vehicle control, the method comprising:
   capturing vehicle events via one or more sensors associated with a plurality of on-vehicle event detection systems,
   generating, at each of the plurality of on-vehicle event detection systems, vehicle event datasets characterizing the detected vehicle events;
   transmitting the vehicle event datasets characterizing detected vehicle events via one or more communication networks from the plurality of on-vehicle event detection systems to a remote computer system;
   generating, via one or more off-vehicle driver log-in/log-out devices, driver log-in event datasets characterizing detected driver log-in events, and driver log-out event datasets characterizing detected driver log-out events, wherein each driver log-in and driver log-out event is for a respective driver;
   transmitting the generated at least one of the driver log-in event dataset and the driver log-out event dataset via one or more communication networks to the remote computer system;
   receiving the vehicle event data sets from the on-vehicle event detection systems via the one or more communication networks and receiving the least one of the driver log-in event dataset and the driver log-out event dataset from the one or more off-vehicle driver log-in/ log-out devices via the one or more communication networks, including receiving the vehicle event datasets from the on-vehicle event detection systems independently of the least one of the driver log-in event dataset and the driver log-out event dataset from the one or more off-vehicle driver log-in/log-out devices;

storing event datasets in a computer readable database, wherein the event datasets include the generated vehicle event datasets, driver log-in event datasets, and driver log-out event datasets including storing the vehicle event datasets independently of the least one of the driver log-in event dataset and the driver log-out event dataset;

determining, via a linking module stored in a computer memory and executed on a computer processor, an association between one or more of the stored vehicle events and one or more of the respective drivers based on two or more of the event datasets retrieved from the database datasets including one of the vehicle event datasets and one or more of the driver log-in and driver log-out datasets, to thereby determine one or more drivers of a particular vehicle at a time that a vehicle event for the particular vehicle occurred; and transmitting, via the one or more communication networks, a control signal for controlling a vehicle system, based on the association of the one or more vehicle events with the one or more respective drivers.

12. The method of claim 11, wherein the association of the one or more vehicle events with the one or more respective drivers occurs after the generation of the vehicle event datasets corresponding to the associated vehicle events.

13. The method of claim 11, wherein the database and the linking module are off-vehicle.

14. The method of claim 11, wherein the vehicle event dataset includes: an event time and an event location.

15. The method of claim 11,
wherein each driver log-in event datasets includes data characterizing respective log-in time, log-in location, and driver identification, and
wherein each driver log-out event dataset includes data characterizing respective log-out time, log-out location, and driver identification.

16. The method of claim 11, further comprising:
establishing, via the linking module, one or more plausible links between vehicle events, and between vehicle events and driver log-in/log-out events,
wherein the association of the one or more vehicle events with the one or more respective drivers is based on the one or more plausible links between vehicle events.

17. The method of claim 16, wherein the plausible links are determined based on a calculated temporal limit.

18. The method of claim 16, wherein the plausible links are determined based on a determined range limit.

19. The method of claim 11, wherein determining an association between the one or more vehicle events and one or more of the respective drivers includes associating at least one vehicle event with a plurality of drivers according to the plausibility of each individual association.

20. The method of claim 11, wherein the driver log-in event and the driver log-out event occur after the one or more vehicle events.

* * * * *